(12) United States Patent
Konno et al.

(10) Patent No.: US 9,778,948 B2
(45) Date of Patent: Oct. 3, 2017

(54) INFORMATION PROCESSING APPARATUS, COMPUTER READABLE STORAGE MEDIUM, AND COLLECTING METHOD

(71) Applicant: FUJITSU LIMITED, Kawasaki-shi, Kanagawa (JP)

(72) Inventors: Yuuji Konno, Yokohama (JP); Naoki Matsumoto, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 13/887,406

(22) Filed: May 6, 2013

(65) Prior Publication Data

US 2014/0040663 A1 Feb. 6, 2014

(30) Foreign Application Priority Data

Jul. 31, 2012 (JP) ................. 2012-170195

(51) Int. Cl.
| | | |
|---|---|---|
| G06F 11/00 | (2006.01) | |
| G06F 9/46 | (2006.01) | |
| H04L 29/12 | (2006.01) | |
| G06F 11/20 | (2006.01) | |

(52) U.S. Cl.
CPC ............ *G06F 9/46* (2013.01); *G06F 11/2028* (2013.01); *H04L 61/2038* (2013.01); *H04L 61/6022* (2013.01)

(58) Field of Classification Search
CPC ...... G06F 3/067; G06F 13/385; G06F 3/0632; G06F 3/0607; G06F 1/32; G06F 2213/3808; G06F 3/0605; G06F 3/0625; G06F 3/0634; G06F 17/30424; G06F 1/206; G06F 1/3206; G06F 1/3209; G06F 21/575; G06F 11/20–11/2051; G06F 9/4401; G06F 9/4411; G06F 9/44505; G06F 15/177; G06F 11/2028; G06F 9/46; H04L 61/2038; H04L 61/6022
See application file for complete search history.

(56) References Cited

U.S. PATENT DOCUMENTS

| | | | |
|---|---|---|---|
| 7,512,830 B2 * | 3/2009 | Chu ................... | G06F 11/2028 714/4.11 |
| 2004/0153697 A1 * | 8/2004 | Chang ................. | G06F 11/2051 714/4.1 |
| 2007/0174658 A1 * | 7/2007 | Takamoto et al. ................ | 714/4 |
| 2008/0133963 A1 * | 6/2008 | Katano et al. .................... | 714/4 |
| 2010/0064165 A1 * | 3/2010 | Kambara et al. ................ | 714/4 |
| 2010/0106987 A1 * | 4/2010 | Lambert ............... | G06F 1/3203 713/320 |

(Continued)

FOREIGN PATENT DOCUMENTS

| | | |
|---|---|---|
| JP | 2010-147929 | 7/2010 |
| JP | 2010-233006 | 10/2010 |

*Primary Examiner* — Jason Bryan
(74) *Attorney, Agent, or Firm* — Fujitsu Patent Center

(57) ABSTRACT

An information processing apparatus includes a processor, and a memory connected to the processor, that stores a piece of identification information allocated to a physical partition in the information processing apparatus. The processor executes a process including collecting pieces of the identification information that are stored by other information processing apparatuses included in an information processing system. The process includes notifying an operating system of the pieces of the identification information collected at the collecting.

5 Claims, 12 Drawing Sheets

(56) References Cited

U.S. PATENT DOCUMENTS

2010/0162241 A1    6/2010  Koma
2010/0250717 A1*   9/2010  Akagi ............... H04L 29/12254
                                                                709/221
2013/0198346 A1*   8/2013  Jubran et al. ................. 709/220

* cited by examiner

FIG.3

| BB #0 | HOST ID #0 | MAC ADDRESS #0 |
| --- | --- | --- |
| BB #1 | HOST ID #1 | MAC ADDRESS #1 |
| BB #2 | HOST ID #2 | MAC ADDRESS #2 |
| BB #3 | HOST ID #3 | MAC ADDRESS #3 |

FIG.4

| BB #0 | HOST ID #0 | MAC ADDRESS #0 |
| --- | --- | --- |
| BB #0 | HOST ID #1 | MAC ADDRESS #1 |
| BB #1 | HOST ID #2 | MAC ADDRESS #2 |
| BB #2 | HOST ID #3 | MAC ADDRESS #3 |
| ⋮ | ⋮ | ⋮ |

INFORMATION PROCESSING APPARATUS, COMPUTER READABLE STORAGE MEDIUM, AND COLLECTING METHOD

CROSS-REFERENCE TO RELATED APPLICATIONS

This application is based upon and claims the benefit of priority of the prior Japanese Patent Application No. 2012-170195, filed on Jul. 31, 2012, the entire contents of which are incorporated herein by reference.

FIELD

The embodiments discussed herein are related to an information processing apparatus, a collecting program, and a collecting method.

BACKGROUND

There is a known conventional server system that allocates device unique information, such as a host ID or a media access control (MAC) address, to each physical partition in which a single Operating System (OS) is operated. Such a server system is shipped such that, in order to set device unique information in each physical partition, the number of pieces of device unique information and the maximum number of settings of the physical partitions are previously set to the same number.

In the following, an example of a server system that includes a casing in which device unique information is previously set will be described with reference to FIG. 12. FIG. 12 is a schematic diagram illustrating a conventional server system. In the example illustrated in FIG. 12, a server system 50 includes, in a casing 51, four system boards (SB) 52 to 55, a managing unit 56a, which is an active managing unit, a managing unit 56b, which is a standby managing unit, a FAN 57, and a power supply unit (PSU) 58.

Because the SBs 52 to 55 implement services provided by the server system 50, each of the SBs 52 to 55 is an information processing apparatus that executes various applications. For example, the SB 52 includes multiple central processing units (CPUs) #0 to #3, a system controller (SC), and a memory and it executes various applications that provide the services. The FAN 57 is a cooling fan that cools each of the SBs 52 to 55. The PSU 58 is an electrical power supply device that supplies electrical power to the SBs 52 to 55, to the managing unit 56a, to the managing unit 56b, and the like.

When the server system 50 operates each SB as a single physical partition, the casing 51 described above is shipped in a state in which four pieces of device unique information are previously set up in the managing unit 56a. Then, when the casing 51 is booted up, the managing unit 56a allocates, one by one, the device unique information to each of the SBs 52 to 55. Then, each of the SBs 52 to 55 provides a service by using the device unique information allocated by the managing unit 56a.

Because the server system 50 operates as a system that continues its operation even if a failure occurs, the server system 50 includes, in addition to the active managing unit 56a, the standby managing unit 56b. If the managing unit 56a fails, the server system 50 allows the managing unit 56a to notify the managing unit 56b of various kinds of setting information on each of the SBs 52 to 55 including the device unique information and continues its operation by using the managing unit 56b.

In contrast, in addition to the system in which multiple SBs are in a single casing, there is a known server system that uses a building block (BB) system that includes multiple casings that independently operate. The server system that uses such a building block system is constructed for each casing regardless of the size of the system. In the following, a server system that uses the building block system will be described with reference to FIG. 13.

FIG. 13 is a schematic diagram illustrating an example of a server system that uses a building block system. As illustrated in FIG. 13, a server system 60 that uses the building block system includes multiple casings 61 to 64 and each of the casings 61 to 64 is connected by a network. Furthermore, the casing 61 includes CPUs #0 to #3, an SC, a memory, a managing unit 56c, the FAN 57, and the PSU 58. Furthermore, it is assumed that the casings 62 to 64 are the same as the casing 61.

If the device unique information allocated to each physical partition is changed, a setting change task for each application is needed. To avoid a change in device unique information due to an increase or a decrease in the number of physical partitions, each of the casings 61 to 64 are shipped in a state in which the maximum number of device unique information used by the server system 60 is previously set up in the managing unit in each of the casings 61 to 64.

Then, by using the device unique information previously set up in the managing unit in the casing operating as an active casing, the server system 60 executes an OS or the like and provides a service. For example, if the server system 60 uses the casing 61 as an active casing, the managing unit 56c in the casing 61 notifies the OS of the previously set device unique information and provides the service.

Patent Document 1: Japanese Laid-open Patent Publication No. 2010-233006
Patent Document 2: Japanese Laid-open Patent Publication No. 2010-147929

However, with the server system in the building block system described above, because the maximum number of pieces of device unique information used by the server system is previously set up in the managing unit in each of the casings, there is a problem in that device unique information that is not used is still present.

For example, if the maximum number of pieces of device unique information used by the server system 60 is four, each of the casings 61 to 64 is shipped in a state in which four pieces of device unique information are previously set up in the managing unit. Then, if the server system 60 uses the casing 61 as an active casing, the casing 61 executes an OS by using the device unique information that has been previously set up in the managing unit 56c.

Then, the server system 60 operates while 12 pieces of unused device unique information are set up in the casings 62 to 64. At this point, device unique information, such as a host ID or a MAC address, is used to manage the licenses of software and acquiring MAC addresses and the like is an expense. Consequently, the server system 60 increases a cost for itself.

SUMMARY

According to an aspect of an embodiment, an information processing apparatus includes a processor, and a memory connected to the processor, that stores a piece of identification information allocated to a physical partition in the information processing apparatus. The processor executes a process including collecting pieces of the identification information that are stored by other information processing apparatuses included in an information processing system. The process includes notifying an operating system of the pieces of the identification information collected at the collecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example of an address management table;

FIG. 4 is a schematic diagram illustrating an example of an address management table when multiple physical partitions are set;

DESCRIPTION OF EMBODIMENTS

Preferred embodiments of the present invention will be explained with reference to accompanying drawings.

[a] First Embodiment

Figure 1:
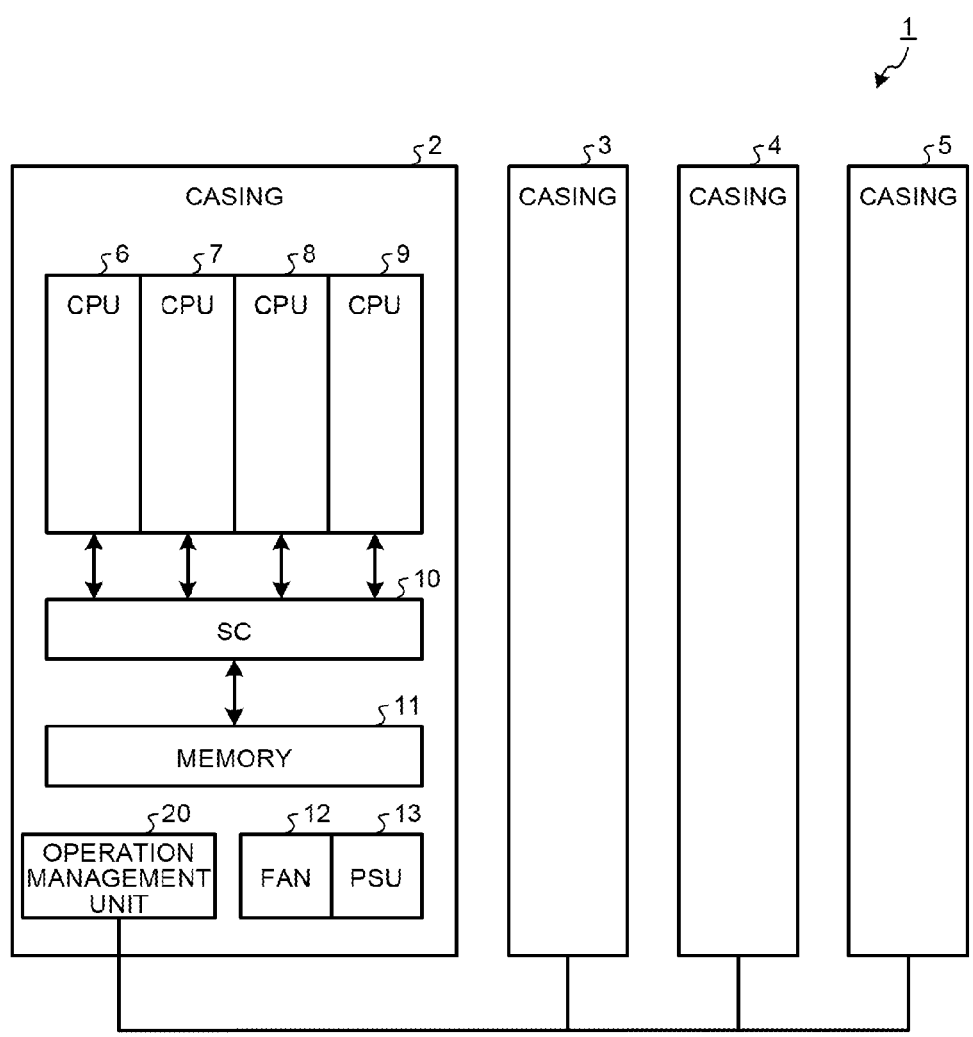
FIG. 1 is a schematic diagram illustrating an information processing system according to a first embodiment.

In a first embodiment, an example of an information processing system that includes multiple information processing apparatuses that each have an independent casing will be described with reference to FIG. 1. FIG. 1 is a schematic diagram illustrating an information processing system according to a first embodiment. An information processing system 1 is a system that includes multiple information processing apparatuses that each have at least an independent casing and that each provide various services.

As illustrated in FIG. 1, the information processing system 1 includes multiple casings 2 to 5 and each of the casings 2 to 5 is connected by an arbitrary network, such as a local access network (LAN). FIG. 1 illustrates an example in which the information processing system 1 includes four casings 2 to 5; however, the embodiment is not limited thereto. For example, the information processing system 1 may also includes an arbitrary number of casings.

Furthermore, each of the casings 2 to 5 has the same function as that performed by the casing 2; therefore, a description thereof will be omitted. Furthermore, the casings 2 to 5 are independent casings and are information processing apparatuses that are individually shipped for the construction of the information processing system 1. For example, the casings 2 to 5 are servers that can independently operate and are called building boxes (BB).

The casing 2 includes multiple CPUs 6 to 9, an SC 10, a memory 11, a FAN 12, a PSU 13, and an operation management unit 20. The CPUs 6 to 9 are arithmetic processing units that execute an operating system (OS) that controls the casing 2 or execute various application programs. The SC 10 controls the memory access of each of the CPUs 6 to 9 to the memory 11. The memory 11 is a storage device that stores therein programs executed by the CPUs 6 to 9 or data used when the programs are executed.

The FAN 12 is a cooling fan that cools various devices included in the casing 2, such as the CPUs 6 to 9, the SC 10, the memory 11, the PSU 13, the operation management unit 20, and the like. Instead of the FAN 12, the casing 2 may also includes an arbitrary cooling system, such as a water cooling system. The PSU 13 is an electrical power supply that supplies electrical power to various devices included in the casing 2, such as the CPUs 6 to 9, the SC 10, the memory 11, the PSU 13, the operation management unit 20, and the like.

The operation management unit 20 cooperates with the operation management unit included in the other casings 3 to 5 and has a function of managing the operation of the information processing system 1. Specifically, when the casing 2 is shipped, a single piece of device unique information that is assigned to a physical partition is set up in the operation management unit 20. The operation management unit 20 cooperates with the operation management units included in the other casings 3 to 5 and selects, in accordance with a predetermined rule, a casing that operates as an active casing.

Furthermore, when the casing 2 is operating as an active casing, the operation management unit 20 communicates with the operation management units included in the casings 3 to 5 and collects device unique information previously set up in each of the casings 3 to 5. Then, when the information processing system 1 is booted up, the operation management unit 20 notifies, via firmware, an OS that is executed by the casing 2 of the collected pieces of device unique information. Thereafter, the information processing system 1 performs processes by allocating the pieces of device unique information collected by the operation management unit 20 to the physical partitions in the information processing system 1.

Figure 2:
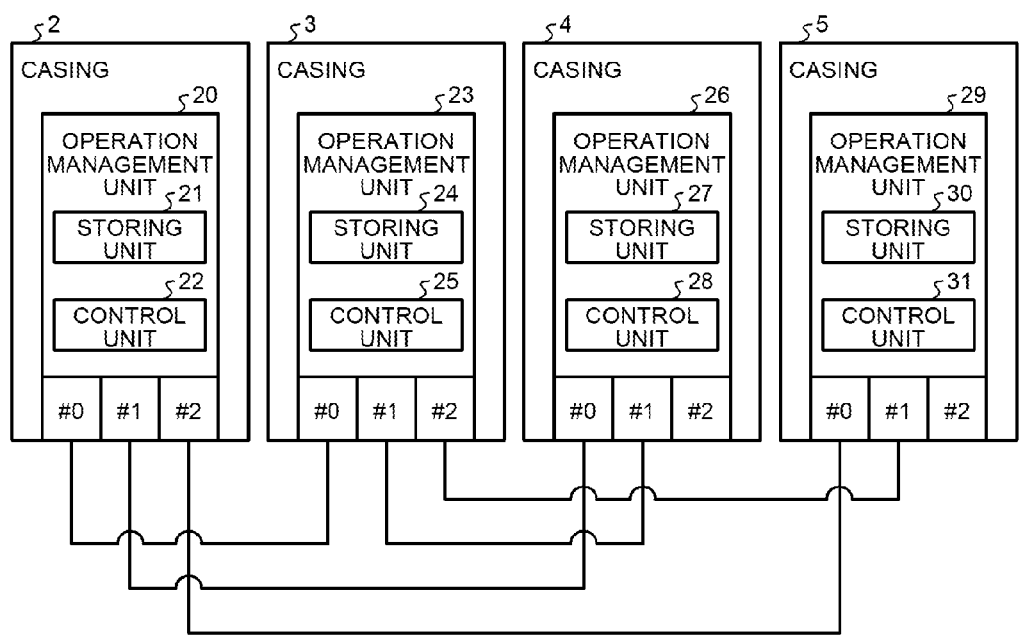
FIG. 2 is a schematic diagram illustrating a process performed by an operation management unit in each casing.

In the following, a process performed by the operation management unit 20 will be described with reference to FIG. 2. FIG. 2 is a schematic diagram illustrating a process performed by an operation management unit in each casing. As illustrated in FIG. 2, the operation management unit 20 includes a storing unit 21 and a control unit 22. Furthermore, similarly to the casing 2, the casing 3 includes an operation management unit 23 that includes a storing unit 24 and a control unit 25.

Furthermore, similarly to the casing 2, the casing 4 includes an operation management unit 26 that includes a storing unit 27 and a control unit 28. Furthermore, similarly to the casing 2, the casing 5 includes an operation management unit 29 that includes a storing unit 30 and a control unit 31. The operation management unit 23, the operation management unit 26, and the operation management unit 29 have the same functions as those performed by the operation management unit 20; therefore, descriptions thereof in detail will be omitted.

At this point, in the storing unit 21, the storing unit 24, the storing unit 27, and the storing unit 30, pieces of device unique information that are allocated to physical partitions of the casings 2 to 5 are previously stored. For example, the storing unit 21 previously stores therein the host ID "#0" and the MAC address "#0" and the storing unit 24 previously stores therein the host ID "#1" and the MAC address "#1". Furthermore, the storing unit 27 previously stores therein the host ID "#2" and the MAC address "#2" and the storing unit 30 previously stores therein the host ID "#3" and the MAC address "#3".

In the example described above, each of the storing units 21, 24, 27, and 30 stores therein a single host ID and a MAC address. Specifically, if a single physical partition is set up in each of the casings 2 to 5, each of the storing units 21, 24, 27, and 30 stores therein a piece of device unique information that identifies a single casing; however, the embodiment is not limited thereto. For example, each of the storing units 21, 24, 27, and 30 may also store therein one of a single host ID and a MAC address.

Furthermore, if multiple physical partitions are set up in each of the casings 2 to 5, each of the storing units 21, 24, 27, and 30 may also store therein the same number of host IDs and MAC addresses as there are the physical partitions. For example, if two physical partitions are set up in the casing 4, the storing unit 27 may also previously store therein two host IDs and two MAC addresses.

As described above, when the casings 2 to 5 are shipped, pieces of device unique information, the number of pieces of which stored in a casing being the same as the number of pieces needed by that casing, are stored in each of the storing units 21, 24, 27, and 30. For example, if a single physical partition is set up in the casing 2, a single host ID and a single MAC address are previously stored when the casing 2 is shipped. Furthermore, if two physical partitions are set up in the casing 3, two host IDs and two MAC addresses are stored when the casing 3 is shipped.

In the following, the connections between the operation management units 20, 23, 26, and 29 will be described. For example, because the operation management unit 20 connects to the other operation management units 23, 26, and 29 via a LAN, the operation management unit 20 includes three LAN ports #0 to #2. Furthermore, in the example illustrated in FIG. 2, the LAN port #0 of the operation management unit 20 is connected to the LAN port #0 of the operation management unit 23; the LAN port #1 is connected to the LAN port #0 of the operation management unit 26; and the LAN port #2 is connected to the LAN port #0 of the operation management unit 29. Furthermore, the LAN port #1 of the operation management unit 23 is connected to the LAN port #1 of the operation management unit 26 and the LAN port #2 is connected to the LAN port #1 of the operation management unit 29.

Consequently, with this connection, the casing 2 operates as a server with the casing number "BB #0" and the casing 3 operates as a server with the casing number "BB #1". Furthermore, the casing 4 operates as a server with the casing number "BB #2" and the casing 5 operates as a server with the casing number "BB #3". The casing number of the casing 4 and the casing 5 may also be the other way round.

At this point, from among the casings 2 to 5, the casings that are connected to all of the other casings are the casing 2 with the casing number #0 and the casing 3 with the casing number #1. Accordingly, each of the operation management units 20, 23, 26, and 29 selects, as a cooperative and active operation management unit, one of the casing 2 with the casing number #0 and the casing 3 with the casing number #1 and uses the other casings as standby operation management units.

Specifically, when the information processing system 1 is booted up, each of the operation management units 20, 23, 26, and 29 selects, in accordance with the following rule, an active operation management unit if an active operation management unit fails or if an instruction is received from an operator. Namely, each of the operation management units 20, 23, 26, and 29 selects only a single active operation management unit and uses the other operation management units as standby operation management units.

Furthermore, each of the operation management units 20, 23, 26, and 29 uses, as an active operation management unit, one of the operation management unit 20 included in the casing 2 with the casing number #0 and the operation management unit 23 included in the casing 3 with the casing number #1. Furthermore, from among the operation management units 20, 23, 26, and 29, the operation management unit included in the casing with the casing number #2 or the subsequent casing number, i.e., the operation management units 26 and 29, are always used as standby operation management units.

Furthermore, because each of the operation management units 20, 23, 26, and 29 maintains the state at the time of previous booting to the maximum extent possible, each of the operation management units 20, 23, 26, and 29 uses the operation management unit, which was selected at the previous booting as the active operation management unit, as the active operation management unit again. For example, if each of the operation management units 20, 23, 26, and 29 selects the operation management unit 20 as an active unit, the power supply of the information processing system 1 is turned off. If the power supply of the information processing system 1 is turned on again, the operation management unit 20 is selected as an active unit to the maximum extent possible.

Furthermore, if the operation management unit 20 is not able to be re-selected as an active unit for some reason, for example, the casing 2 fails, each of the operation management units 20, 23, 26, and 29 selects, from among the operation management units selectable as an active unit, an operation management unit in a casing with the lowest casing number. Specifically, if the operation management unit 20 is not able to be selected as an active unit, each of the operation management units 20, 23, 26, and 29 selects the operation management unit 23 as a new active unit.

In the following, a process performed by an active operation management unit will be described. In the following, an example in which the operation management unit 20 is selected as an active unit will be described. Furthermore, in the following, a description will be given of processes performed by an active operation management unit, such as a process that creates an address management table; a process that maintains the address management table; and a process, if an active operation management unit fails, that selects a new active operation management unit.

First, a description will be given of a process, performed by the active operation management unit 20, that creates an address management table. For example, the operation management unit 20 communicates with the operation management units 23, 26, and 29 in the casings 3 to 5, respectively, via a LAN and collects device unique information stored in the operation management units 23, 26, and 29. Then, the operation management unit 20 creates an address management table that contains the collected pieces of device unique information and stores the created address management table in the storing unit 21.

FIG. 3 is a schematic diagram illustrating an example of an address management table. For example, the operation management unit 20 stores, in an associated manner, a combination of the host ID "#0" and the MAC address "#0" stored in the storing unit 21 and the casing number "BB #0" of the casing 2. Furthermore, the operation management unit 20 stores, in an associated manner, a combination of the host ID "#1" and the MAC address "#1" stored in the storing unit 24 and the casing number "BB #1" of the casing 3.

Furthermore, the operation management unit 20 stores, in an associated manner, a combination of the host ID "#2" and the MAC address "#2" stored in the storing unit 27 and the casing number "BB #2" of the casing 4. Furthermore, the operation management unit 20 stores, in an associated manner, a combination of the host ID "#3" and the MAC address "#3" stored in the storing unit 30 and the casing number "BB #3" of the casing 3.

Furthermore, if multiple host IDs and MAC addresses are stored in one of the storing units, the operation management unit 20 stores, in an associated manner, a combination of the multiple combinations of host IDs and MAC addresses and the casing number of the collection source. FIG. 4 is a schematic diagram illustrating an example of an address management table when multiple physical partitions are set.

For example, if two physical partitions are set up in the casing 2, two host IDs "#0" and "#1" and two MAC addresses "#0" and "#1" are previously stored in the storing unit 21. Accordingly, the operation management unit 20 creates an address management table in which the host ID "#0" and the MAC address "#0" are associated with the device number "BB #0" and the host ID "#1" and the MAC address "#1" are associated with the device number "BB #0".

Then, the operation management unit 20 gives the address management table to the firmware, thereby notifying the OS in the casing 2 of the content of the address management table. Consequently, the information processing system 1 allocates the pieces of device unique information collected by the operation management unit 20 to each of the physical partitions so that the process can be performed. Specifically, each of the casings 2 to 5 previously stores therein device unique information that is allocated to a physical partition in each of the casings.

Then, the active operation management unit 20 collects pieces of device unique information from the casings 2 to 5 and notifies the OS of the collected device unique information. Consequently, the information processing system 1 can acquire device unique information that is allocated to each physical partition without generating device unique information that is not used.

In the following, a description will be given of a process performed, by the active operation management unit 20, that maintains the address management table. For example, the operation management unit 20 communicates with the operation management units 23, 26, and 29 via a LAN or the like in an active state of the information processing system 1 and accesses the storing units 24, 27, and 30 included in the operation management unit 23, 26, and 29, respectively. Then, the operation management unit 20 determines whether a storing unit that is not to be accessible is present. If a storing unit that is not to be accessible is present, the operation management unit 20 instructs the firmware to delete, from the address management table, the device unique information that has been collected from the storing unit that is not to be accessible.

Specifically, the operation management unit 20 instructs the firmware to exclude, from being the target for the allocation to a physical partition, device unique information that was collected from a casing that fails or the casing that was removed in order to reduce the size of the information processing system 1. For example, if the operation management unit 20 is not able to access the storing unit 27 anymore, the operation management unit 20 deletes the host ID "#2" and the MAC address "#2" that are associated with the casing number "BB #2" in the address management table illustrated in FIG. 3. Consequently, the firmware excludes the host ID "#2" and the MAC address "#2" from being the target for the allocation to the physical partition.

For example, the operation management unit 20 has a register and stores the address management table in the register. At this point, by using the register that stores therein the address management table as a register that is accessible from the firmware or the OS, it is possible for the firmware or the OS to acquire the device unique information stored in the address management table. Furthermore, by deleting the device unique information stored in the register, the operation management unit 20 may also exclude the device unique information from being the target for the allocation.

Even if a casing that is not used is present due to degeneracy or the like, the operation management unit 20 does not update the address management table. Furthermore, if the operation management unit 20 is not able to access the storing unit 27 after the power supply of the casing 4 is turned off, i.e., is stopped or reduced, the operation management unit 20 deletes both the host ID "#2" and the MAC address "#2" that are associated with the casing number "BB #2". In contrast, if the casing 4 is reduced while the power supply of the casing 4 is turned on, i.e., is subjected to active reduction, the operation management unit 20 issues a reduction command indicating an end of error of.

Furthermore, if a board having mounted thereon the operation management unit 23 is changed or the device unique information that has previously been stored by the storing unit 24 is deleted, the operation management unit 20 acquires, from the address management table, the device unique information that is associated with the device number of the casing 3. Then, the operation management unit 20 writes back the acquired device unique information to the storing unit 24.

In the following, a description will be given of a process performed by each of the operation management units 20, 23, 26, and 29 for selecting an active operation management unit when the active operation management unit 20 fails. For example, if the operation management unit 20 detects a failure in the casing 2 or the operation management unit 20, the operation management unit 20 selects a new operation management unit, from among standby operation management units, that can be switched to an active unit.

Then, the operation management unit 20 transmits, to the selected operation management unit, an interruption notification and switches the active operation management units. Then, the operation management unit that has received the interruption notification collects device unique information from the other operation management units including the operation management unit that corresponds to the transmission source of the interruption notification, creates an address management table, and operates as a new active operation management unit.

Furthermore, if the operation management unit 23 operates as an active operation management unit, the operation management unit 20 operates as a standby operation management unit. At this point, if a failure has occurred in the operation management unit 23, the operation management unit 20 receives an interruption notification from the operation management unit 23. Then, the operation management unit 20 creates an address management table by collecting device unique information from the storing units 24, 27, and 30 and operates as a new active operation management unit.

Figure 5:
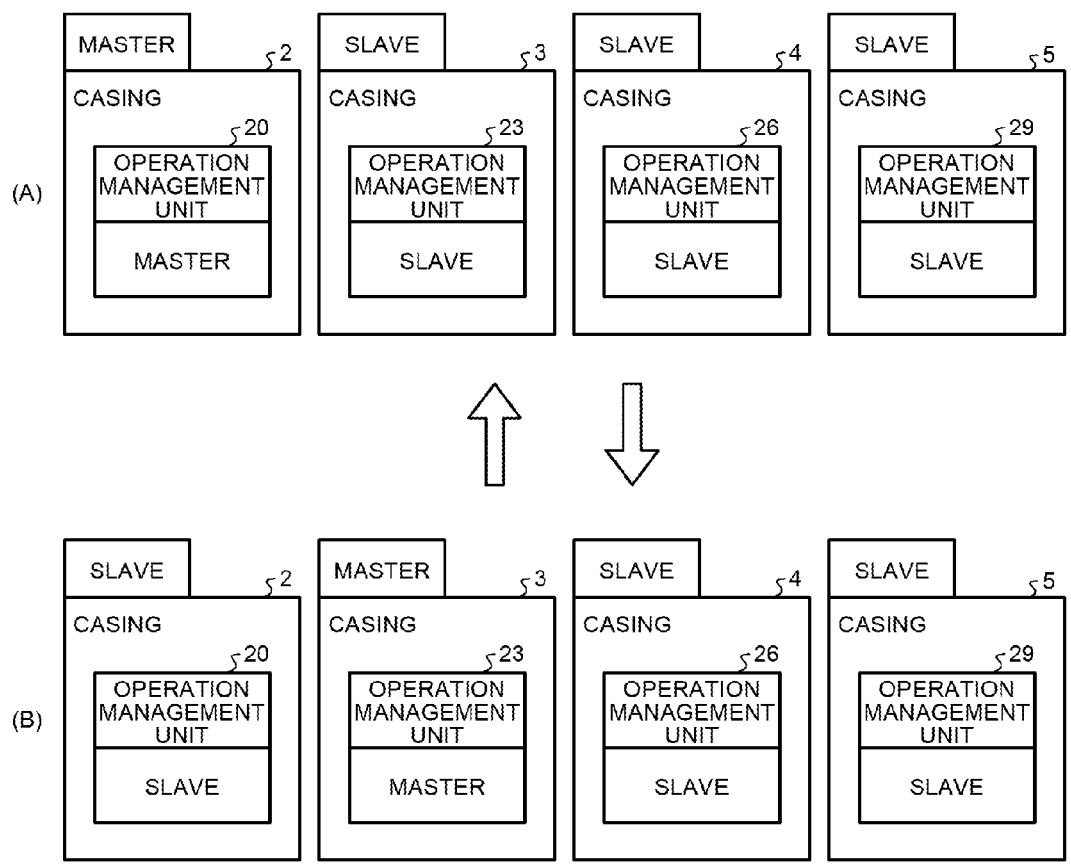
FIG. 5 is a schematic diagram illustrating an example of a switching process between an active system and a standby system.

In the following, an example of a process that switches between the active and standby operation management unit will be described with reference to FIG. 5. FIG. 5 is a schematic diagram illustrating an example of a switching process between an active system and a standby system. In the example illustrated in FIG. 5, an active operation management unit is represented by "master" and a standby operation management unit is represented by "slave". For example, as illustrated in (A) of FIG. 5, the operation management unit 20 in the casing 2 operates as a master, the operation management unit 23 in the casing 3, the operation management unit 26 in the casing 4, and the operation management unit 29 in the casing 5 operate as slaves.

At this point, if the operation management unit 20 detects a failure therein, the operation management unit 20 determines that the operation management unit 23 is an operation management unit that can be switched to being a master. Then, the operation management unit 20 transmits the interruption notification to the operation management unit 23. Then, the operation management unit 23 acquires the device unique information that has previously been stored in the storing unit 24 of its own.

Furthermore, the operation management unit 23 collects the device unique information from the storing units 21, 27, and 30 in the operation management units 20, 26, and 29, respectively, and creates an address management table. Then, the operation management unit 23 operates as a master. Consequently, as illustrated in (B) of FIG. 5, the operation management unit 23 in the casing 3 operates as a master and the operation management unit 20, the operation management unit 26, and the operation management unit 29 operate as slaves.

Furthermore, after the casing 2 or the operation management unit 20 is repaired, if the operation management unit 23 detects a failure therein, the operation management unit 23 transmits the interruption notification to the operation management unit 20. Then, as illustrated in (A) of FIG. 5, the operation management unit 20 re-creates the address management table and operates as a master and the operation management unit 23 operates as a slave.

Figure 6:
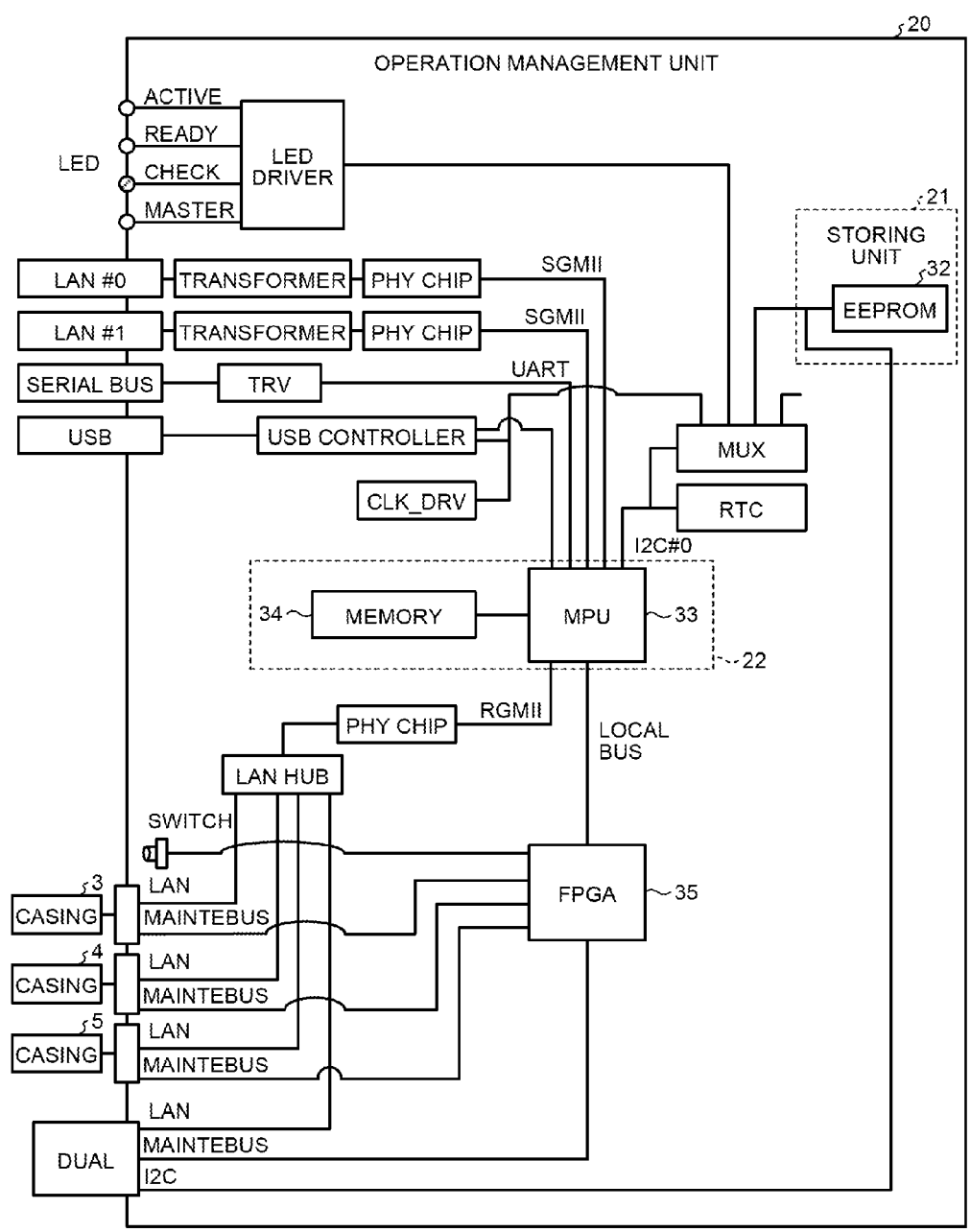
FIG. 6 is a schematic diagram illustrating an example of the hardware configuration of the operation management unit.

In the following, an example of hardware that operates as the operation management unit 20 will be described with reference to FIG. 6. FIG. 6 is a schematic diagram illustrating an example of the hardware configuration of the operation management unit. As illustrated in FIG. 6, the operation management unit 20 includes, as a storing unit, an Electrically Erasable Programmable Read-Only Memory (EEPROM) 32.

Furthermore, the operation management unit 20 includes, as the control unit 22, a Micro Processing Unit (MPU) 33 and a memory 34. Furthermore, the operation management unit 20 includes a field programmable gate array (FPGA) 35 that is connected to the MPU 33 via a local bus.

The FPGA 35 is connected to the casings 3 to 5 via maintenance buses. Furthermore, the EEPROM 32 is connected to the operation management unit 23, which operates as an active unit, via an Inter Integrated Circuit (I2C) and a connector called as a DUAL. If an operation management unit that operates as an active unit is present in addition to the operation management unit 23, the operation management unit 20 is connected, via the DUAL, to an EEPROM that stores therein device unique information on the active operation management unit.

Furthermore, the device unique information allocated to the physical partition in the casing 2 is stored in the EEPROM 32 when the casing 2 is shipped. The memory 34 is the main memory of the operation management unit 20 and is, for example, a Double Data Rate3 Synchronous Dynamic Random Access Memory (DDR3SDRAM). Furthermore, the firmware for the operation management unit 20 is loaded in the memory 34 by the MPU 33.

Furthermore, the MPU 33 is the main processor of the operation management unit 20 and executes processes, such as a process that creates an address management table described above, a process that maintains the address management table, and a process that selects a new active operation management unit when an active operation management unit fails. For example, if the operation management unit 20 operates as an active unit, the MPU 33 acquires, via the FPGA 35, various kinds of information, such as device unique information, used to operate the information processing system 1 from the operation management units 23, 26, and 29 in the casings 3 to 5, respectively. Then, the MPU 33 creates an address management table and stores the created address management table in the memory 34.

Furthermore, if the operation management unit 20 operates as a standby unit, the MPU 33 receives a request to send the device unique information from the operation management unit 23, which operates as an active unit, via the FPGA 35. Then, the MPU 33 acquires the device unique information from the EEPROM 32 and transmits the device unique information to the operation management unit 23 in the casing 3 via the FPGA 35.

At this point, if the MPU 33 fails or the FPGA 35 fails, the operation management unit 20 is not able to transmit the device unique information stored in the EEPROM 32 to the operation management unit 23 via the FPGA 35. In such a case, the operation management unit 23 can directly read the device unique information from the EEPROM 32 via the DUAL and the I2C. Similarly, because the MPU 33 is connected to the EEPROM included in the operation management unit 23 via the FPGA 35 and the DUAL, the MPU 33 can directly read the device unique information from the failed operation management unit 23.

In the example illustrated in FIG. 6, the operation management unit 20 includes multiple Light Emitting Diodes (LEDs) indicating the state of the operation management unit 20 and includes an LED driver that controls each LEDs. Furthermore, each LED indicates whether the operation management unit 20 is operating (Active), is running in preparation (Ready), is running operational checks (Check), or is operating as a master (Master).

Furthermore, the operation management unit 20 includes a multiplexer (MUX) that switches access destinations of the MPU 33, a Real Time Clock (RTC) for measuring time, and a clock driver (CLK_DRV) that generates a clock signal. Furthermore, the operation management unit 20 includes a USB port for communication that conforms to the Universal Serial Bass (USB) standard and includes a USB controller.

Furthermore, for LAN connections, the operation management unit 20 includes a LAN #0 and a LAN #1, which are LAN ports, a transformer, a Physical Layer (PHY) chip, the casings 3 to 5, and a LAN HUB that concentrates the lines of LAN connections made via the DUAL. Furthermore, the operation management unit 20 includes a TRV for communication via a serial bus.

Figure 7:
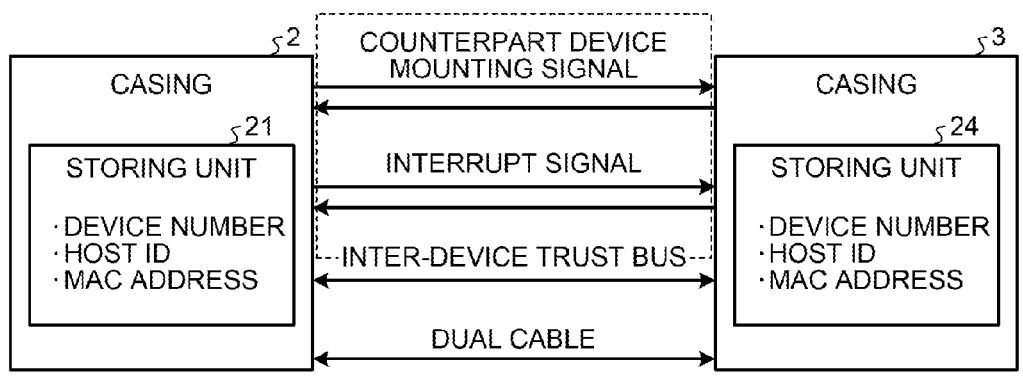
FIG. 7 is a schematic diagram illustrating the connections between the active system and the standby system.

In the following, the connection between an active operation management unit and a standby operation management unit will be described with reference to FIG. 7. FIG. 7 is a schematic diagram illustrating the connections between the active system and the standby system. In the example illustrated in FIG. 7, the storing units 21 and 24 each store therein a device number, a host ID, and a MAC address. The casing 2 is connected to the casing 3 via an inter-device trust bus and a DUAL cable.

At this point, the casing 2 and the casing 3 transmit and receive, via the inter-device trust bus, a counterpart device mounting signal and an interrupt signal. The counterpart device mounting signal is an enable signal indicating whether a counterpart device is connected. For example, by receiving counterpart device mounting signals from the casings 3 to 5, the casing 2 identifies that the casing 2 is connected to three casings and, by transmitting a counterpart device mounting signal to the casings 3 to 5, the casing 2 notifies the casings 3 to 5 that the casing 2 is connected to the casings 3 to 5.

Furthermore, the interrupt signal is a signal that becomes enabled when an abnormality occurs in a counterpart device. For example, if an interrupt signal from the casing 2 becomes enabled, the operation management unit 23 in the casing 3 operates as an active operation management unit. At this point, the operation management unit 23 collects device unique information from the operation management units 20, 26, and 29 via the inter-device trust buses.

Furthermore, if the operation management unit 23 is not able to collect device unique information from the operation management unit 20 via the inter-device trust bus when the operation management unit 20 fails, the operation management unit 23 directly collects the device unique information from the storing unit 21 via the DUAL cable.

Figure 8:
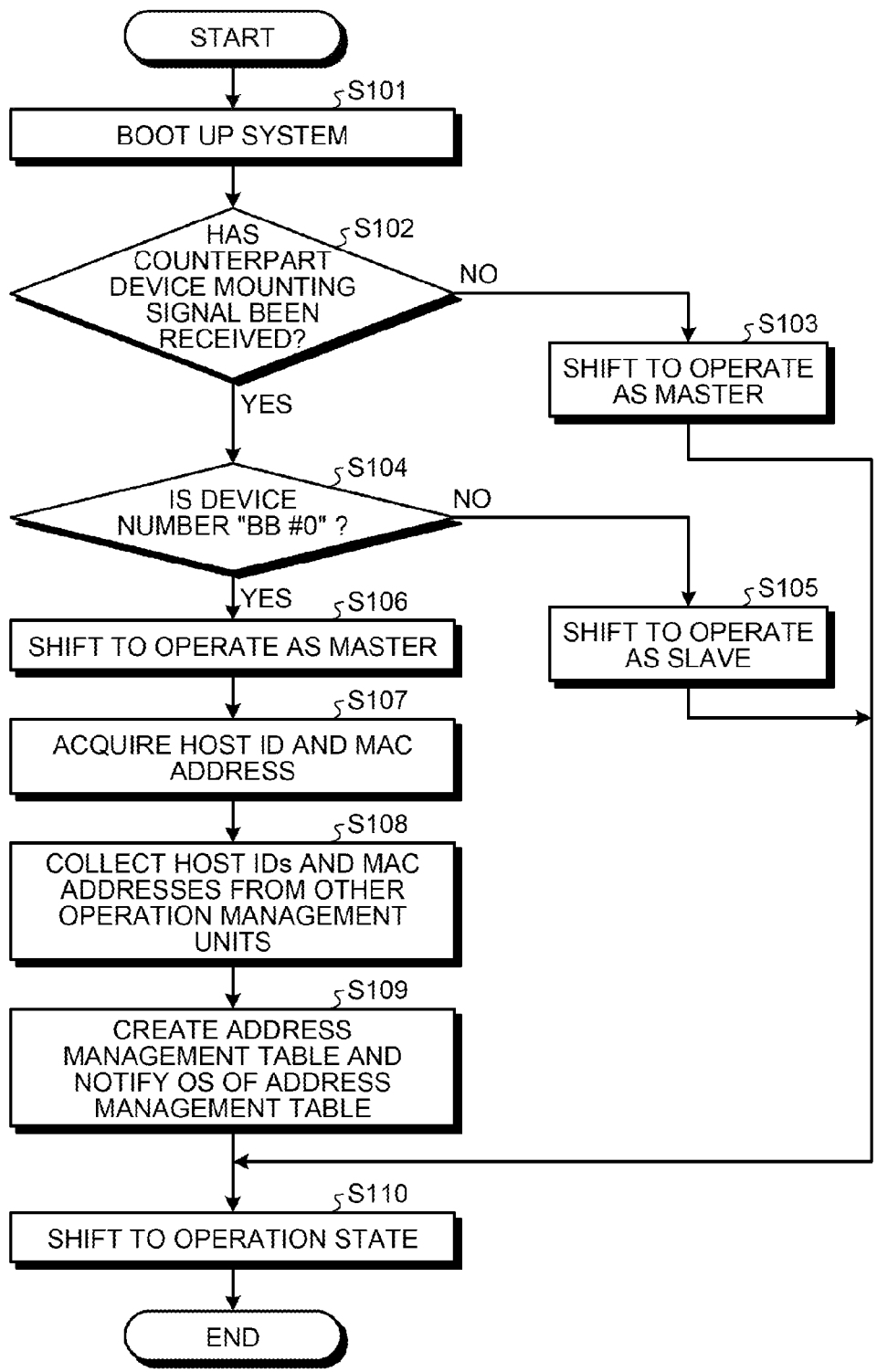
FIG. 8 is a flowchart illustrating the flow of a process that creates the address management table.

In the following, the flow of a process, performed by the active operation management unit 20, that creates an address management table will be described with reference to FIG. 8. FIG. 8 is a flowchart illustrating the flow of a process that creates the address management table. To simplify the description, FIG. 8 illustrates an example in which only an operation management unit included in a casing with the device number of "BB #0" is active, i.e., the casing operates as a master operation management unit.

For example, the operation management unit 20 starts a process triggered when the information processing system 1 is booted up (Step S101). First, the operation management unit 20 determines whether it has received a counterpart device mounting signal (Step S102). If the operation management unit 20 does not receive a counterpart device mounting signal (No at Step S102), the operation management unit 20 determines that only the casing 2 is present in the information processing system 1 and then shifts to operate as a master (Step S103). Then, the operation management unit 20 shifts its state to an operation state (Step S110) and ends the process.

In contrast, if the operation management unit 20 receives a counterpart device mounting signal (Yes at Step S102), the operation management unit 20 determines whether its own device number is "BB #0" (Step S104). If its own device number is not "BB #0" (No at Step S104), the operation management unit 20 shifts to operate as a slave (Step S105) and also shifts to an active state (Step S110). It then ends the process.

Furthermore, if its own device number is "BB #0" (Yes at Step S104), the operation management unit 20 shifts to operate as a master (Step S106). Subsequently, the operation management unit 20 acquires the device unique information that is stored in the operation management unit 20, i.e., a host ID and a MAC address stored in the storing unit 21 (Step S107). Then, the operation management unit 20 collects, from the other operation management units, host IDs and MAC addresses stored in the other management units (Step S108). Then, the operation management unit 20 creates an address management table and notifies, via the firmware, the OS of the address management table (Step S109). Then, the operation management unit 20 shifts to an active state (Step S110) and ends the process.

Figure 9:
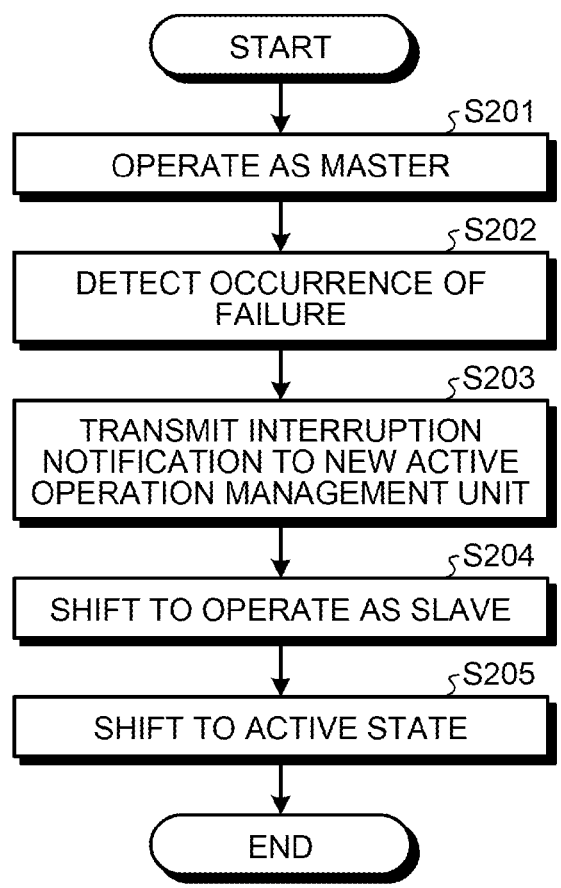
FIG. 9 is a flowchart illustrating the flow of a process performed by an active operation management unit when a failure has occurred.

In the following, the flow of a process performed by the active operation management unit 20 when a failure has occurred will be described with reference to FIG. 9. FIG. 9 is a flowchart illustrating the flow of a process performed by an active operation management unit when a failure has occurred. In the example illustrated in FIG. 9, if a failure occurs in the active operation management unit 20, the operation management unit 23 is selected as a new active operation management unit.

First, the operation management unit 20 operates as an active operation management unit, i.e., as a master (Step S201). At this point, if the operation management unit 20 detects the occurrence of a failure (Step S202), the operation management unit 20 transmits the interruption notification to the new active operation management unit 23 (Step S203) and shifts to a standby operation management unit, i.e., operates as a slave (Step S204). Then, the operation management unit 20 shifts to an active state (Step S205) and ends the process.

Figure 10:
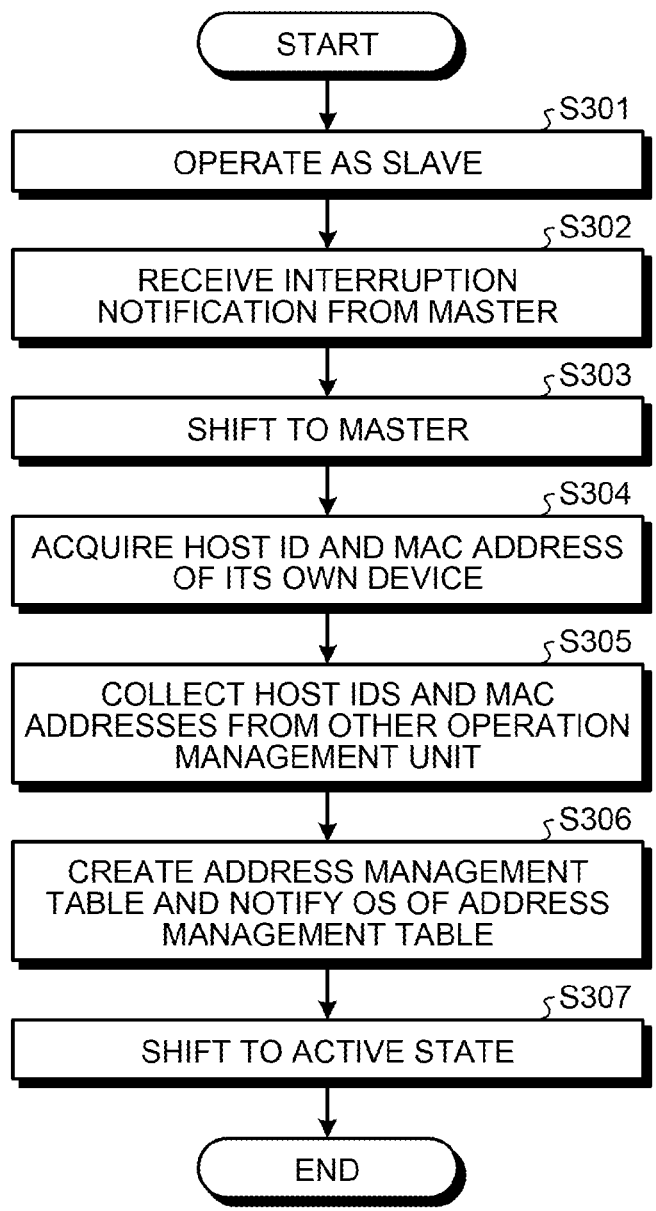
FIG. 10 is a flowchart illustrating the flow of a process performed by another active operation management unit when a failure has occurred.

In the following, the flow of a process performed by the new active operation management unit 23 when a failure has occurred in the active operation management unit 20 will be described with reference to FIG. 10. FIG. 10 is a flowchart illustrating the flow of a process performed by another active operation management unit when a failure has occurred. First, the operation management unit 23 operates as a standby operation management unit, i.e., a slave (Step S301). At this point, if the operation management unit 23 receives an interruption notification from a master operation management unit 20 (Step S302), the operation management unit 23 shifts to a master (Step S303).

Then, the operation management unit 23 acquires the device unique information stored in its own device, i.e., the host ID and a MAC address stored in the storing unit 24 (Step S304). Then, the operation management unit 23 collects a host ID and a MAC address from the other operation management unit (Step S305). Thereafter, the operation management unit 23 creates an address management table and notifies, via the firmware, the OS of the address management table (Step S306). Thereafter, the operation management unit 20 shifts to an active state (Step S307) and ends the process.

Advantage of the First Embodiment

As described above, the casing 2 is included in the information processing system 1 together with the casings 3 to 5. The operation management unit 20 included in the casing 2 stores therein device unique information that is allocated to a physical partition. Then, if the operation management unit 20 operates as an active operation management unit, the operation management unit 20 collects the device unique information stored in the other operation management units 23, 26, and 29. Then, the operation management unit 20 creates an address management table from the collected device unique information and notifies the OS of the created address management table.

Consequently, the information processing system 1 retains the minimum number of pieces of device unique information and thus implements the saving of the resources. For example, if a physical partition is set for each of the casings 2 to 5, the operation management units 20, 23, 26, and 29 are shipped in a state in which a single piece of device unique information is set for each physical partition. Then, the operation management unit 20, which operates as an active operation management unit, collects device unique information and creates an address management table.

Accordingly, the information processing system 1 can use all of the pieces of device unique information that are set up in the operation management units 20, 23, 26, and 29 without leaving out any information. Furthermore, the same number of pieces of device unique information is set as the number of physical partitions that are respectively set up in the casings 2 to 5 in the operation management units 20, 23, 26, and 29, thereby the information processing system 1 operates normally.

Furthermore, if a failure occurs in one of the operation management units 23, 26, and 29, the operation management unit 20 deletes, from the address management table, the device unique information that was collected from the operation management unit in which the failure occurred, thereby excluding that operation management unit from being an allocation target for a physical partition. Consequently, even if a failure occurs in one of the operation management unit 23, 26, and 29, the operation management unit 20 can properly continue its operation.

Furthermore, each of the operation management units 20, 23, 26, and 29 selects an active operation management unit in accordance with a predetermined rule by cooperating with each other. Consequently, the information processing system 1 can automatically select an active operation management unit and start to provide a service without arranging a management device or the like outside each of the casings 2 to 5.

Furthermore, if an active operation management unit fails, each of the operation management units 20, 23, 26, and 29 selects a new active operation management unit in accordance with a predetermined rule. For example, if the active operation management unit 20 fails, each of the operation management units 23, 26, and 29 selects the operation management unit 23 as an operation management unit. Then, the new active operation management unit 23 collects device unique information from each of the operation management units 20, 26, and 29. Consequently, even if the operation management unit 20 fails, the operation management unit 23 manages the device unique information; therefore, the information processing system 1 can continue to provide the service.

Furthermore, if the operation management unit 20 fails when it is operating as an active operation management unit, the operation management unit 20 transmits an interrupt signal to the operation management unit 23, which is selected as the new active operation management unit. Consequently, the operation management unit 23, which will operate as the new active operation management unit, immediately identifies that the operation management unit 20 has failed and thus promptly starts operating as the new active unit. Furthermore, because the operation management unit 23 received the interruption notification collects device unique information from the other operation management units 20, 26, and 29, the operation management unit 23 can operate as the new active operation management unit.

Furthermore, the operation management unit 20 stores therein the same number of pieces of device unique information as the number of physical partitions that are set up in the casing 2. Furthermore, similarly to the other operation management units 23, 26, and 29, each of the operation management units 23, 26, and 29 stores therein the same number of pieces of device unique information as the number of physical partitions that are set up in the casings 3 to 5. Consequently, if the casings 2 to 5 are connected, the information processing system 1 can allocate the device unique information to all of the physical partitions that are set up.

[b] Second Embodiment

In the above explanation, a description has been given of the embodiment according to the present invention; however, the embodiments are not limited thereto and can be implemented with various kinds of embodiments other than the embodiment described above. Therefore, another embodiment included in the present invention will be described as a second embodiment below.

(1) The Number of Casings

The information processing system 1 includes four casings 2 to 5; however, the embodiment is not limited thereto. The information processing system 1 may also includes an arbitrary number of casings. The reason for this is that, if the operation management unit 20 operates as an active operation management unit, the operation management unit 20 collects, from each operation management unit, the device unique information allocated to all of the physical partitions that are set up in the information processing system 1 regardless of the number of casings.

(2) Rule for Selecting an Active Operation Management Unit

In the information processing system 1 described above, the operation management unit 20 or the operation management unit 23 is selected as an active operation management unit. However, the embodiment is not limited thereto. For example, if all of the operation management units 20, 23, 26, and 29 are connected with each other, the operation management unit 26 or the operation management unit 29 may also be selected as an active operation management unit. Furthermore, if one of the operation management units 20, 23, 26, and 29 is not able to be selected as new operation management unit, the unselectable operation management unit may also notify a user of an error and ends a process.

(3) Device Unique Information

The operation management units 20, 23, 26, and 29 described above each store therein host IDs and the MAC addresses as device unique information; however, the embodiment is not limited thereto. For example, arbitrary information may also be stored as device unique information as long as information is allocated to a physical partition.

(4) Program

Figure 11:
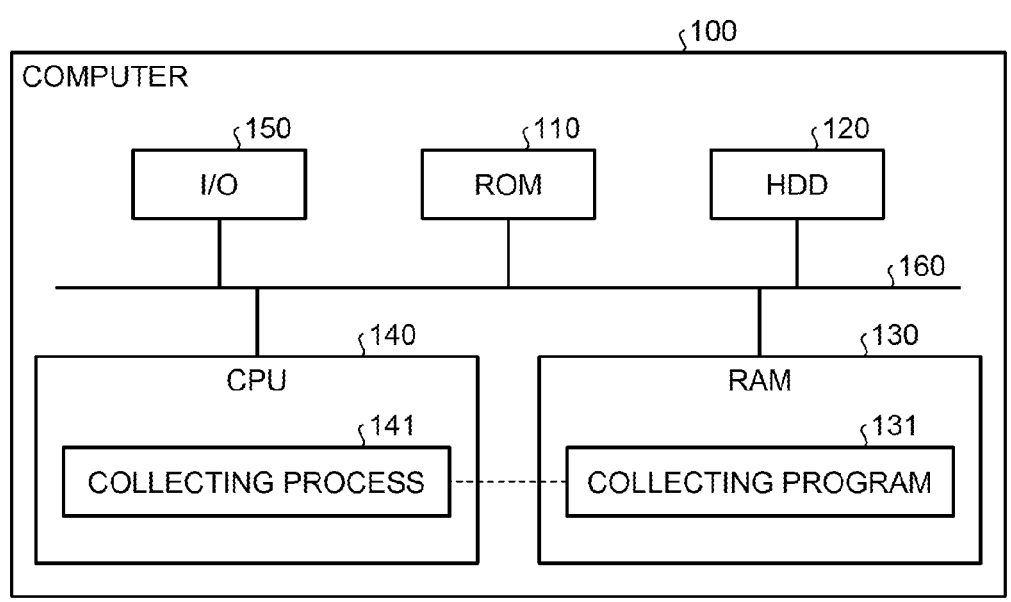
FIG. 11 is a block diagram illustrating an example of a computer that executes a collecting program.
Figure 12:
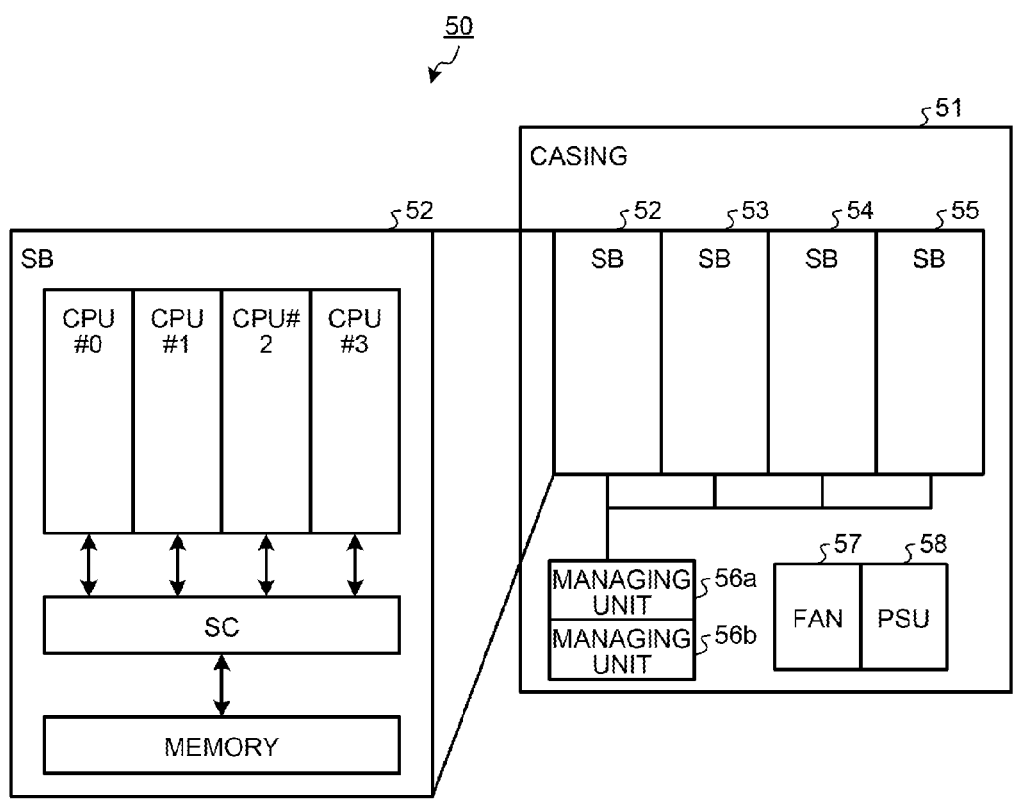
FIG. 12 is a schematic diagram illustrating a conventional server system.
Figure 13:
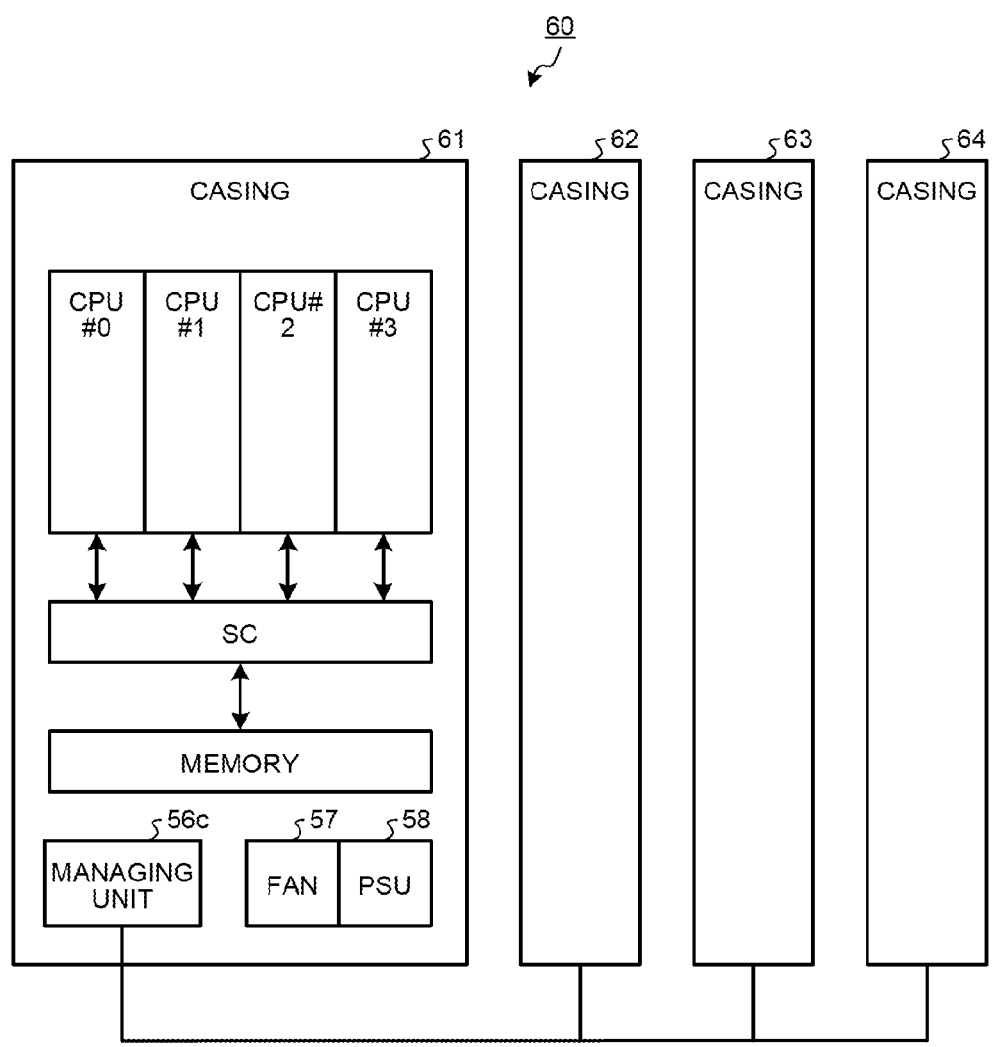
FIG. 13 is a schematic diagram illustrating an example of a server system that uses a building block system.

In the above explanation, a description has been given of a case in which the operation management unit 20 according to the first embodiment implements various processes by using hardware; however, the embodiment is not limited thereto. For example, the processes may also be implemented by a program prepared in advance and executed by a computer. Accordingly, in the following, an example of a computer that executes a program having the same function as that performed by the operation management unit 20 according to the first embodiment will be described with reference to FIG. 11. FIG. 11 is a block diagram illustrating an example of a computer that executes a collecting program.

A computer 100 illustrated in FIG. 11 includes a read only memory (ROM) 110, a hard disk drive (HDD) 120, a random access memory (RAM) 130, a central processing unit (CPU) 140, all of which are connected by a bus 160. Furthermore, the computer 100 illustrated in FIG. 11 includes an input/output (I/O) 150 used to connect to another computer.

The RAM 130 stores therein a collecting program 131. As illustrated in FIG. 11, the CPU 140 reads the collecting program 131 from the RAM 130 and executes it so that the collecting program 131 functions as a collecting process 141. The collecting process 141 executes the same process performed by the operation management unit 20 illustrated in FIG. 1.

The collecting program 131 described in the embodiment can be implemented by programs prepared in advance and executed by a computer, such as a personal computer or a workstation. The program can be distributed via a network, such as the Internet.

Furthermore, the collecting program 131 is stored in a computer-readable recording medium, such as a hard disk, a flexible disk (FD), and a compact disc read only memory (CD-ROM). Furthermore, the collecting program 131 may also be implemented by a computer reading it from the recording medium.

Furthermore, the collecting program 131 can function not only as an application program but also as part of the functions included in the OS or as part of firmware.

According to an aspect of the embodiment, the information processing apparatus can keep the number of pieces of device unique information to a minimum to save resources.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system having a plurality of information processing apparatuses, each of the plurality of information processing apparatuses comprising:
 a processor;
 a memory, connected to the processor, that stores device unique information for each of a plurality of physical partitions in an information processing apparatus, from among the plurality of information processing apparatuses, in which the processor is installed, the processor executes a process comprising:
 booting up an operating system of the information processing apparatus;
 determining after the booting, whether the information processing apparatus has received a counterpart device mounting signal from a counter information processing apparatus connected to the information processing apparatus;
 deciding a master or a slave to which the information processing apparatus shifts its state based on the received counterpart device mounting signal and a device number of the information processing apparatus; and
 shifting the state to the master or the slave based on the decision on the deciding, and when the information processing apparatus is decided to shift the state to the master;
 collecting device unique information stored in other information processing apparatuses in the plurality of information processing apparatuses,
 generating an address management table having a plurality of entries each including device numbers of the plurality of information processing apparatuses and device unique information based on the collected device unique information,
 notifying the generated address management table to the booted operating system, and
 starting system operation of the information processing apparatus by shifting to an operation state.

2. The information processing apparatus according to claim 1, wherein when the information processing apparatus is decided to shift the state to the master;
 detecting an occurrence of a failure of the information processing apparatus,
 transmitting an interruption notification to another information processing apparatus which is active in the plurality of information processing apparatuses, and
 shifting the state of the information processing apparatus to the slave.

3. The information processing apparatus according to claim 1, wherein when the information processing apparatus is decided to shift the state to the slave;
 receiving an interruption notification from another information processing apparatus shifted to the master,
 shifting the state of the information processing apparatus to the master,
 collecting device unique information stored in the information processing apparatus,
 generating an address management table having a plurality of entries each including device number and device unique information based on the collected device unique information,
 notifying the generated address management table to the booted operating system of the information processing apparatus, and
 starting system operation of the information processing apparatus by shifting to an operation state.

4. A controlling method of an information processing system performed by each of the plurality of information processing apparatuses included in the information processing system, the controlling method comprising:
 booting up an operating system of an information processing apparatus, from among the plurality of the information processing apparatuses, in which a processor is installed;
 determining after the booting, whether the information processing apparatus has received a counterpart device mounting signal from a counter information processing apparatus connected to the information processing apparatus;
 deciding a master or a slave to which the information processing apparatus shifts its state based on the received counterpart device mounting signal and a device number of the information processing apparatus; and shifting the state to the master or the slave based on the decision on the deciding, and when the information processing apparatus is decided to shift the state to the master;
  collecting device unique information stored in other information processing apparatuses in the plurality of information processing apparatuses,
  generating an address management table having a plurality of entries each including device numbers of the plurality of information processing apparatuses and device unique information based on the collected device unique information,
  notifying the generated address management table to the booted operating system, and
  starting system operation of the information processing apparatus by shifting to an operation state.

5. A non-transitory computer readable storage medium having stored therein a controlling program causing each of the plurality of information processing apparatuses included in the information processing system to execute a process, the process comprising:
  booting up an operating system of an information processing apparatus, from among the plurality of the information processing apparatuses, in which a processor is installed;
  determining after the booting, whether the information processing apparatus has received a counterpart device mounting signal from a counter information processing apparatus connected to the information processing apparatus;
  deciding a master or a slave to which the information processing apparatus shifts its state based on the received counterpart device mounting signal and a device number of the information processing apparatus; and
  shifting the state to the master or the slave based on the decision on the deciding, and when the information processing apparatus is decided to shift the state to the master;
    collecting device unique information stored in other information processing apparatuses in the plurality of information processing apparatuses,
    generating an address management table having a plurality of entries each including device numbers of the plurality of information processing apparatuses and device unique information based on the collected device unique information,
    notifying the generated address management table to the booted operating system, and
    starting system operation of the information processing apparatus by shifting to an operation state.

* * * * *